May 22, 1945.　　P. E. CHATELAIN　　2,376,476
AUTOMATIC SCREW MACHINE
Filed Sept. 22, 1943　　4 Sheets-Sheet 1

INVENTOR.
Paul E. Chatelain.
BY Gray and Smith
ATTORNEYS.

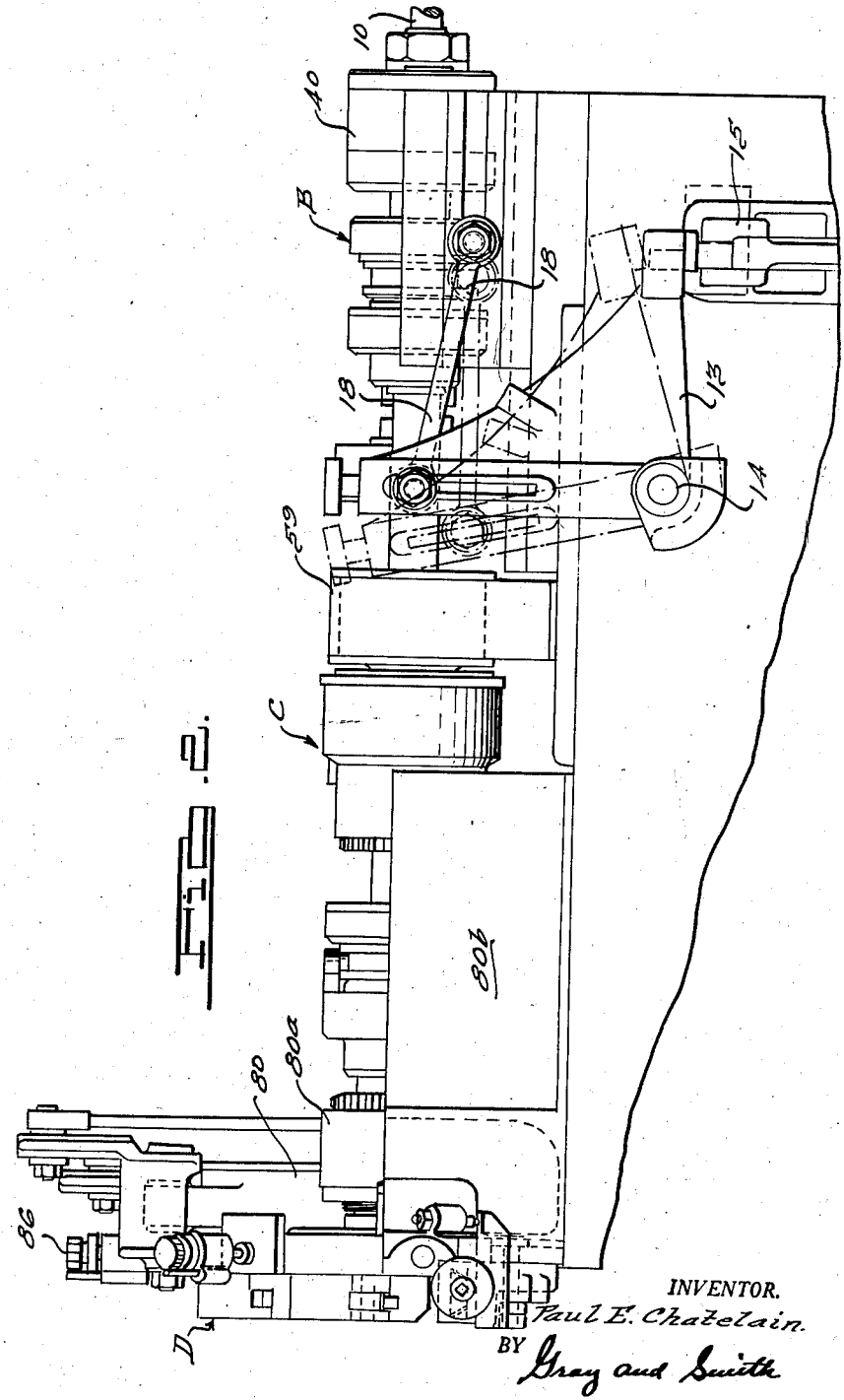

May 22, 1945.　　　P. E. CHATELAIN　　　2,376,476
AUTOMATIC SCREW MACHINE
Filed Sept. 22, 1943　　　4 Sheets-Sheet 3
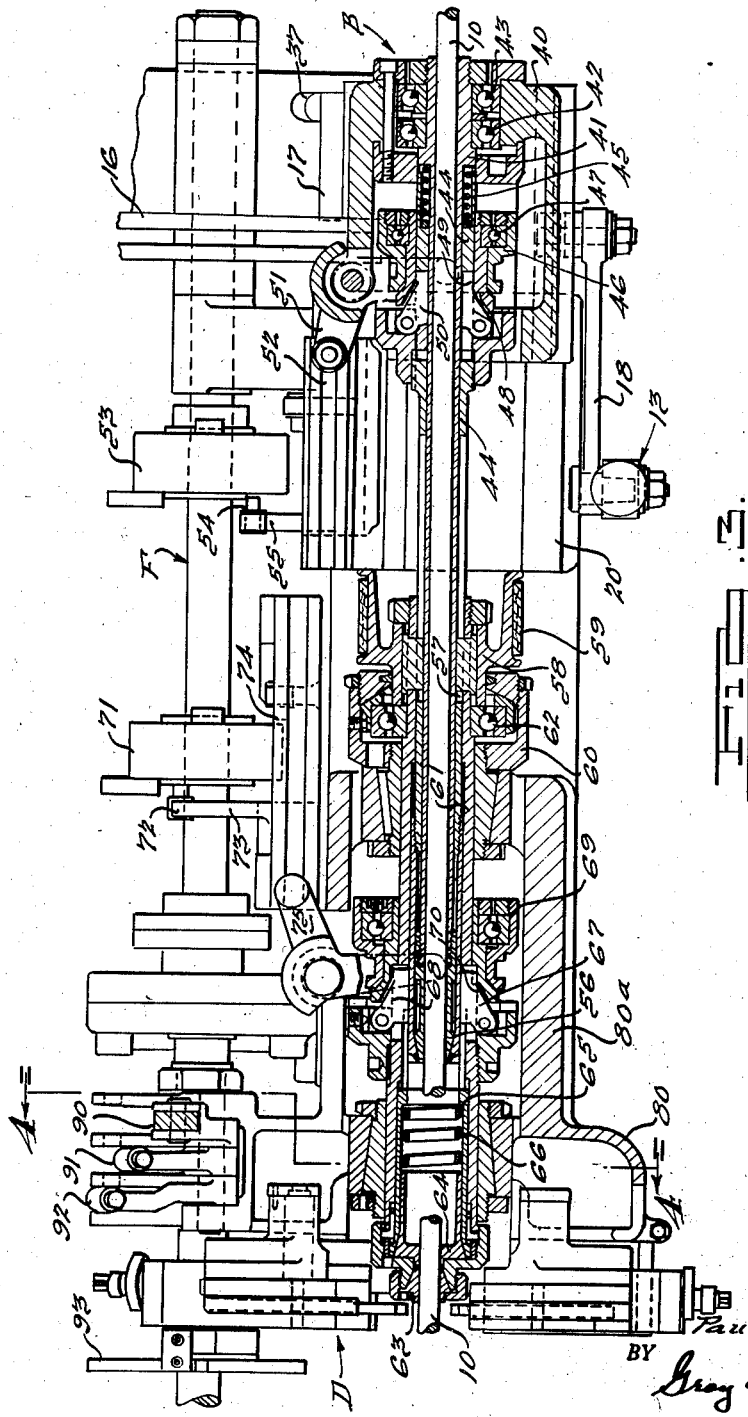
INVENTOR.
Paul E. Chatelain.
BY
Gray and Smith
ATTORNEYS.

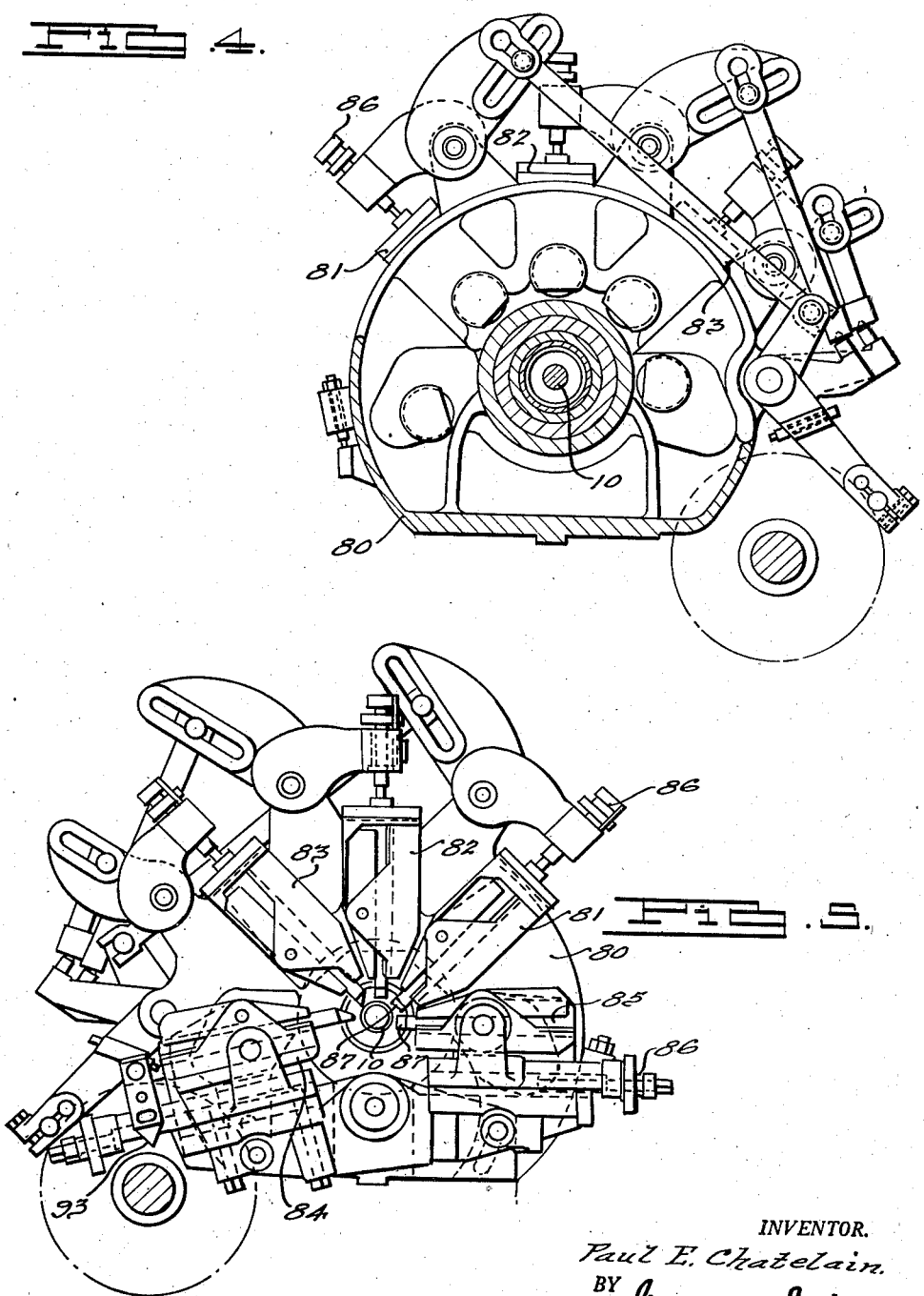

Patented May 22, 1945

2,376,476

UNITED STATES PATENT OFFICE 2,376,476

AUTOMATIC SCREW MACHINE

Paul E. Chatelain, Detroit, Mich., assignor to The Wickman Corporation, Highland Park, Mich., a corporation of Ohio Application September 22, 1943, Serial No. 503,346

6 Claims. (Cl. 82—2)

The present invention relates to improvements in automatic screw machines and more particularly to improvements in the mechanisms thereof to permit speeding up of the operation cycle in automatic screw machines of the Swiss type. The term "automatic screw machines of the Swiss type" is used herein in its accepted sense to designate an automatic single spindle screw machine in which the stock is rotated and is fed axially during the cut so as to provide the longitudinal component of the feed.

A primary object of the present invention is to provide an improved Swiss type automatic screw machine in which a new type of cam controlled stock feeding and gripping device is provided to cut down the time required in the complete operative cycle of the machine, thereby to permit an increase in the speed of operation and output of the machine.

A further object of the present invention is to provide an automatic screw machine of the Swiss type in which the weight of the moving parts of the feed head is reduced over that of conventional type, thereby permitting the use of a lighter return spring or weight and a reduction in lag in the movement of the headstock and a reduction in wear on the operating cam mechanisms.

A further object of the present invention is to provide an improved work-holding and stock feeding device and operative controls therefor to speed up the operative cycle in various types of automatic screw machines in which a rotating work piece is advanced in predetermined feeling cycles through a series of machining or other metal forming operations.

It is a further object of the present invention to provide an automatic screw machine of the Swiss type in which a single integral casting acts as the tool head, and as a portion of the feed head housing and provides a longer key on the tool head thus securing a rigid mounting and positive alignment of the tool head on the machine.

Other objects of this invention will appear in the following description and appended claims, reference being had to the accompanying drawings forming a part of this specification wherein like reference characters designate corresponding parts in the several views.

In the drawings:

Fig. 2 is a fragmentary side elevation particularly showing the novel stock feeding and headstock mechanisms embodying the present invention.

Fig. 3 is a horizontal section through the novel stock feeding and headstock mechanisms embodying the present invention.

Fig. 4 is a section on the staggered section line 4—4 looking in the direction of the arrows of Fig. 3.

Fig. 5 is an end elevation of the tool supporting head.

Figure 1:
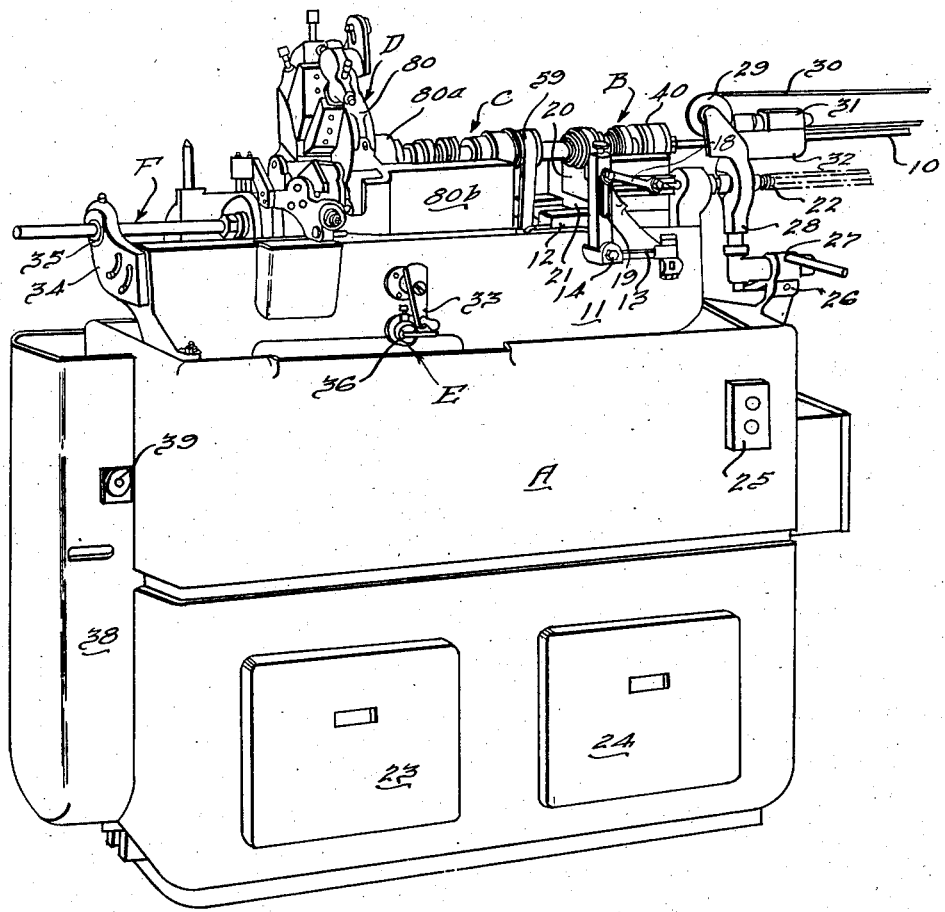
Fig. 1 is a side perspective view of an automatic screw machine of the Swiss type embodying the present invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

While the present invention is concerned primarily in improvements in the stock feeding and gripping mechanisms, the drawings show the invention in a preferred embodiment and in combination with the other elements of a Swiss type automatic screw machine. In such a machine the improved device of the present invention is used to feed the revolving stock past various vertically movable and radially operated cutting tools. The stock is fed longitudinally relative to the cutting tools in a series of intermittent operations which, in synchronism with the operation of the cutting tools, forms predetermined contours on the work piece and cuts the work piece to the desired length. The headstock containing the feeding spindle for rotating, carrying and feeding the bar stock is controlled in its feeding operation by a control cam and is returned to its initial position after a predetermined stroke by a return spring. The cutting tools are each moved relative to the work piece by a separate control cam.

Prior to the present invention, a single bar gripping collet was employed in the movable headstock and acted as the feeding spindle. It was controlled by a collet control cam which operated from a control cam shaft which also carried the cams which controlled the radial movement and operation of the cutting tools and the longitudinal movement of the headstock. In a typical instance when the collet was opened and before it was closed, a total of approximately 25 degrees of cam shaft rotation was consumed. During the collet opening and closing, the other parts of the machine were non-productive. In most instances where a weight or pressure fed bar stock was employed, it was necessary to leave the cut-off tool at centre while the collet was released and the headstock returned to its back position. The cut-off tool then serves as a stock-stop. This required withdrawing of the tool before each successive feeding operation and thus further extended the time cycle required for each complete operation of the machine. Since positive operation, accurate and simplified timing is desirable, it is preferable to control all the machine operations from a single cam shaft so that for each rotation of the shaft the machine completes one operation cycle. Thus reduction in the required time cycle permits more rapid cam shaft rotation and allows greater flexibility in the design of the control and operating cams which results in an increase in the productive speed of the machine. In particular, the novel headstock and feeding and gripping device of the present invention permits the simultaneous performance of a selected machine operation during the return movement of the headstock. By thus combining two operations during a single time interval, there is a reduction of the lag usually resulting from the return movement in the stock feeding operation.

General description of machine

Referring to Figs. 1 and 2 a Swiss type automatic screw machine in which the present invention is embodied, is shown by way of example. Such a machine comprises in general a machine base or support A, a headstock B, a feeding head assembly C. The headstock B is movable on ways in the base toward and away from the tool head D. A feed clutch E (Fig. 1) and a cam shaft and operating cams F (see also Fig. 3) control the operation of the machine.

In operation bar stock 10 is supplied through bar stock feeding supports of conventional design (not shown). Preferably such stock feeding supports include means for exerting a force on the bar stock to effect longitudinal movement thereof. The forward feeding of the bar stock 10 is effected by movement of the headstock B and the feeding spindle C. The stock 10 is moved longitudinally relative to the tool-head D by the head-stock B while being rotated by the feeding spindle C. The cutting tools on the tool-head D are moved toward and away from the bar stock by suitable tool operating cams driven by a cam shaft F. These cams progressively advance and return the cutting tools in a predetermined sequence relative to the moving work piece portion of the bar stock 10. The separate motions, that is, the longitudinal travel of the head-stock B, the rotation of the feeding spindle C, and the movement of the cutting tools on the tool-head D, are each performed separately during each operating cycle of the machine but may be so synchronized if desired that the cutting tool acts on the work piece during its longitudinal movement as well as during its rotation. The operation of the component parts of the machine will be apparent from the following description of structure and operation of each assembly.

The base "A"

The base A carries on its top a machine bed plate 11 having ways 12 upon which the head-stock B is moved by operation of a pivoted head-stock bell crank operating lever 13, which pivots about a fixed pivot point 14 in response to movement of a head-stock operating arm 15 which contacts one arm of the said bell crank 13. The head-stock operating arm 15 is moved by a head-stock control cam 16 (see Fig. 3) which operates an operating lever 17 which moves the operating arm 15. A connecting link 18 is connected at one end with a slot 19 in the other arm of the bell crank 13, and at its opposite end with the base 20 of the head-stock. The feeding position of the link 18 and the levers 13 and 15 is indicated in dotted line in Fig. 2. The base 20 of the head-stock has an extending portion 21 which moves in the ways 12. A return spring 22 acts on the head-stock base 20 and resiliently resists its movement toward the tool head D and acts to return the headstock to its starting position at the completion of each operating cycle.

If desired, a bell cam may be used in place of the plate cam 16. In this event, a bell cam roller is attached to the bracket 37 carried by the base 20. When a bell cam is so used, the cam 16 and the head-stock operating levers above described may be eliminated.

The base A on the side shown in Fig. 1 is provided with removable access panels 23 and 24 to permit ready access to the motor, gearing, bearing, shafts and the like (not shown) which are contained in the base. A removable guard portion 38 is detachably connected with the base and may be removed therefrom by operation of the guard release knob 39. An electric push-button 25 acts as a control switch of the "on and off" type and provides the means for starting and stopping the electric motor (not shown) which drives the machine.

A bracket 26 is mounted on one end of the bed plate 11 and is provided with an adjustable clamp 27 holding a pulley sheave arm 28 having a pulley 29 in which is threaded a material control cable 30 which is suitably connected with the conventional bar supporting and feeding units (not shown) and acts to exert a constant forward feeding force on the bar stock 10.

The pulley sheave arm 28 carries a limit switch 31 electrically connected with the power circuit to the motor. The limit switch 31 acts to break the circuit to the motor when the ends of the bar 10 pass through a bar guide in the base 32 which supports the switch 31 and is also carried on the pulley sheave arm 28.

By adjustment of the clamp 27 and movement of the pulley sheave arm 28, the bar guide in the base 32 may be alined to assure proper feeding of the bar into the head-stock. When the bar stock has been completely fed into the machine and the machine is stopped, the pulley sheave arm 28 may be moved bodily so as to permit ready removal of the short length of stock then in the machine. This facilitates reloading of the machine after each bar is consumed.

A manually actuated crank 33 extends through the bed plate 11 and permits manual operation of the machine when desired to check the timing of the cams and the various adjustments of the machine in setting it up for various operations.

At the end of the bed plate 11 opposite the bracket 26, a camshaft support 34 is provided and carries a bearing 35 in which the camshaft F is mounted. The feed clutch E, which is of any desired conventional construction, well known to those skilled in the art and, therefore, not here shown in detail, is operated by the feed clutch operating lever 36.

The head-stock "B"

Mounted on the head-stock base 20 is the head-stock, best shown in detail in Fig. 3. In all of the views, the head-stock is shown in its retracted position at the beginning of the machine cycle. During this cycle the head-stock will move on the base 20 and the ways 12 toward the tool head D. The head-stock B comprises a housing 40 mounted on the base 20 in which a floating spindle 41 is journalled in precision preloaded thrust and radial ball bearings 42 and 43. The bar feed stock is fed from the bar stock supports into the open end of the floating spindle 41.

A collet operating sleeve 44 and a collet operating spring 45 surround the spindle 41. A collet control collar 46 extends around the sleeve 44 and is mounted on ball bearings 47. The collet control collar 46 has a conical bearing face 48 acting on pivoted collet sleeve operating dogs 49 and 50 which act on the collet operating sleeve 44 to effect endwise movement thereof against the action of the collet operating spring 45.

The collet control collar 46 is moved into and out of contact with the sleeve operating dogs 49 and 50 by a pivoting collet shifting fork 51 having a depending portion on one arm extending into a way 52 pivotally mounted on the bed plate 11.

The way 52 is moved pivotally relative to the bed plate 11 by the action of the collet operating cam 53 which moves the collet cam follower 54 on an arm 55 which is secured to the way 52. Thus by tilting the way 52 by action of the cam 53, the collet shifting fork 51 will be pivoted during the movement of the head-stock B, and will act on the collet control collar 46 to move or release the collet sleeve operating dogs 49 and 50 to move the collet operating sleeve 44 which controls the action of the spring jaw collet 56 in selectively gripping and releasing the bar stock 10 as required.

The floating spindle is longitudinally splined as at 57 and is rotated by a splined drive pulley 58 driven from the power source by a belt 59.

Feed-head assembly "C"

The feed-head assembly C comprises a housing 60 supporting the hub of the splined drive pulley 58. A sleeve 61 is splined to the spindle 41 and the collet operating sleeve 44 for rotation therewith and is journalled in ball bearings 62 in the housing 60. Mounted on the end of the sleeve 61 is a guide bushing assembly 63 which provides a support for the end of the work. Inside the sleeve 61 adjacent the guide bushing assembly 63 is a split collet 64 and a collet operating sleeve 65 and a collet release spring 66. The collet operating sleeve 65 is moved longitudinally of the collet 64 by pivoted collet sleeve operating dogs 67 and 68 which are controlled by a collet control collar 69 having a conical bearing face 70 operating on the adjacent ends of said pivoted collet sleeve operating dog.

The collet control collar 69 is actuated from the collet control cam 71 on the camshaft F acting on a cam follower 72 on an arm 73 which controls the movement of a pivotally mounted way 74 in which one end of the collet shifting fork 75 is connected. The other end of the collet shifting fork 75 bears on the collet control collar 69 and shifts it in response to movement transmitted from said collet control cam 71.

Tool-head "D"

The tool-head D is mounted on a bracket 80 carried on the bed plate 11. The bracket 80 is a part of a single casting which provides a feed head housing 80a and an elongated key portion 80b. As shown in Figs. 4 and 5, the bracket 80 carries a plurality of rocking and radially movable tool carriers. In the present instance these are five in number and include radially movable tool carriers 81, 82 and 83, and rocker operated tool carriers 84 and 85. Each tool carrier is provided with a micrometer tool adjustment 86 and a cutting tool 87 whose cutting end is selectively brought into cutting contact with the work piece and withdrawn therefrom at predetermined times in each operating cycle. Movement of the tool carriers is controlled by separate cam followers 90, 91, 92 and 93, actuated by separate cams on the camshaft F. The cam followers 90, 91, 92 and 93 transmit the desired motion to the several tool carriers in a predetermined sequence through any suitable interconnecting system of links and levers extending between the cam followers and the tool carriers.

Description of operation

The bar stock 10 is fed through the head-stock B and the floating spindle 41. In Fig. 3 the various parts are shown in their respective positions at the beginning of the operating cycle. At this time all of the tools in the toolhead are removed from cutting contact with the bar stock inasmuch as the cut-off operation has been completed and all of the tools are retracted. For the feeding cycle, the stock 10 is gripped in the spring jaw collet 56 and is released by the split collet 64. The spring jaw collet 56 and the stock 10 is rotated by the drive pulley 58 and is moved toward the tool-head D by movement of the head-stock B according to the design of the head-stock control cam 16. The operation of the tool control cams brings the various tools into cutting contact at predetermined intervals with the moving piece 10 to form the desired contours thereon. When the head-stock B reaches the end of its permitted movement toward the tool-head D, the split collet 64 is operated to grip the stock 10 and the spring jaw collet 56 is released from gripping the stock 10. The cut-off or other desired tool operation is then completed with the stock held in the split collet 64 during the time that the head-stock B is moved to its initial position as shown in Fig. 3.

If desired, two or more forward movements of the head-stock may be made to permit manufacture of a piece longer than is accommodated by a single feeding movement of the headstock. Such multiple movement of the head-stock does not slow down the machine cycle since another tool operation is permitted by using any radially moving tool to cut the desired contour on the part during the return movement of the head-stock. Thus, for example, a six inch piece can be made on a machine set for a maximum head-stock travel of four inches by providing two three inch feeding strokes of the head-stock.

When the initial position, shown in Fig. 3, has been reached the collet 56 is caused to grip the stock and the collet 64 is operated so as to release the stock. The forward movement of the head-stock then advances the bar stock to the cutting tools.

In this manner the stock 10 is at all times gripped by a power driven collet so as to be power rotated during the entire return stroke of the head-stock. It is held by the collet 64 in an operative position for performing the cut-off or other tool operation simultaneously with the return movement of the head-stock. Thus the operative cycle of the machine is speeded up since by the use of the present invention any tool operation using a vertically operating tool may be performed simultaneously with the return movement of the head-stock.

From the foregoing, it will be seen that the head-stock B is moved separately with relation to the fixed stock feeding head C. By this construction, the weight of the movable parts is substantially reduced over conventional constructions in which the feed head and the head-stock are moved as a single integral unit. By use of the present construction therefor, a lighter return spring or weight 22 may be utilized. The resistance to movement of the head-stock is therefore less than in conventional constructions and wear on the operating cams and levers is proportionately reduced.

The separate feed head and head-stock provided by the present invention also permits the use of an integral casting of which the tool head supporting bracket is a part. This construction provides a more rigid bracket than is used in conventional constructions and permits the formation of a longer keyway thus assuring better alinement of the tool head with the other portions of the machine.

A screw machine of the present invention is therefore capable of increased production because of the accelerated operating cycle thus made possible. At the same time, the structural stability, operating characteristics and service life of the machine are substantially improved.

While the drawings show an open machine, it is to be understood that any suitable type of removable cover is intended to be provided for the machine.

Having thus described my invention, I claim:

1. In an automatic screw machine of the Swiss type, a fixed tool head, a plurality of cutting tools mounted thereon for radial movement toward and away from a work piece, control means for moving said cutting tools, and means for feeding a rotating work piece longitudinally of said tools and comprising a head stock movable in the direction of said fixed tool head, a floating spindle journalled therein, a feeding collet secured to said spindle, a holding collet spaced from said feeding collet toward said fixed tool head, power driven means for rotating both of said collets, control means for causing said feeding collet to grip bar stock therein during feeding movement of said head stock toward said tool head, and to release said bar stock during the return movement of said head stock, control means for causing said holding collet to release bar stock therein during feeding movement of said head stock and to grip and rotate said bar stock without longitudinal movement thereof during the return movement of said head stock, and cam actuated operating and timing members for actuating said collets through said gripping and releasing cycles in timed relation to the feeding and return movements of said head stock.

2. In an automatic screw machine of the Swiss type, a stock feeding and gripping device for feeding a rotating work piece longitudinally of a fixed tool supporting head, the combination of a head stock for rotating and moving the work piece longitudinally of said tool supporting head, a feeding collet and a holding collet, means for rotating said collets and control means for selectively gripping a work piece in said feeding collet during feeding movement of said head stock, and releasing said work piece upon completion of said feeding movement, separate control means for actuating said holding collet to grip and rotate said work piece while a tool operation is performed thereon during the return movement of said head stock and to release said work piece upon the gripping engagement thereof by said feeding collet at the end of its return movement, and a cam shaft and actuating cams for moving cam followers and connecting means to effect synchronous movement of the cutting tools relative to the work piece and operation of said collets in synchronism with the longitudinal movements of said head stock.

3. An automatic screw machine of the Swiss type as claimed in claim 1 and further characterized in that said fixed tool head is a part of an integral casting having a central portion housing the holding collet portion of said feed head.

4. An automatic screw machine of the Swiss type as claimed in claim 2 and further characterized in that said fixed tool head is a part of an integral casting having a central portion housing the holding collet portions of said feed head.

5. In an automatic screw machine of the Swiss type, a fixed tool head, a plurality of cutting tools mounted thereon for radial movement toward and away from a rotating and longitudinally movable work piece, control means for selectively moving one of said cutting tools into cutting position on said work piece, and means for feeding a rotating work piece longitudinally while in contact with one of said tools and comprising a head stock movable in the direction of feed, a floating spindle journalled therein, a feeding collet secured to said spindle and adapted to rotate and move the work piece longitudinally toward the said tool head, a longitudinally fixed feed head longitudinally spaced from said head stock in the direction of said fixed tool head, a holding collet in said feed head adapted to rotate said work piece only during the release of said feeding collet, power driven means for rotating both of said collets, collet control means operable to release said feeding collet at a predetermined point in its longitudinal movement and to retract said feeding collet on the work piece while effecting a gripping thereof in said holding collet, and cyclic timing means for synchronizing the radial movement of said tools, operation of said collets and longitudinal feeding of said work piece and comprising cams mounted on a cam shaft and cam followers for actuating operating members certain of which are connected with means for effecting radial movement of said tools and others of which control movement of said head stock and operation of said collet control means.

6. An automatic screw machine of the Swiss type as claimed in claim 5 and further characterized in that a single casting is provided to house said feed head and to act as the said fixed tool head.

PAUL E. CHATELAIN.